United States Patent
Jowett

[11] Patent Number: 5,997,747
[45] Date of Patent: Dec. 7, 1999

[54] TREATMENT OF PHOSPHORUS IN SEPTIC TANK EFFLUENT

[76] Inventor: E. Craig Jowett, 177 Cobblestone Place, PO Box 385, Rockwood, Canada, N2J 4S5

[21] Appl. No.: 08/743,747

[22] Filed: Nov. 7, 1996

[30] Foreign Application Priority Data

Nov. 9, 1995 [GB] United Kingdom ............. 9522986

[51] Int. Cl.⁶ ...................................... C02F 1/42
[52] U.S. Cl. .................... 210/670; 210/679; 210/269; 210/282; 210/283; 210/906
[58] Field of Search ..................... 210/670, 679, 210/269, 282, 283, 284, 906

[56] References Cited

U.S. PATENT DOCUMENTS

| | | | |
|---|---|---|---|
| 2,278,488 | 4/1942 | Ralston | 210/282 |
| 3,983,033 | 9/1976 | de Latour | 210/906 |
| 4,046,939 | 9/1977 | Hart | 210/525 |
| 4,524,139 | 6/1985 | Fuchs | 502/22 |
| 4,843,105 | 6/1989 | Reischl et al. | 210/610 |
| 5,061,367 | 10/1991 | Hatch et al. | 210/282 |

OTHER PUBLICATIONS

E Craig Jowett On–Site Wastewater Treatment Using Unsaturated Adsorbent Biofilters, Journal of Environmental Quality (Jan.–Feb. 1995).

*Primary Examiner*—Ivars Cintins
*Attorney, Agent, or Firm*—Anthony Asquith & Co.

[57] ABSTRACT

Treatment of sewage water contaminated by phosphorus is accomplished by passing the water through iron oxide. The iron oxide is placed in close proximity to soft resilient open-cell foam, which serves to slow down, and even out, the rate of travel of the water while under treatment, thus increasing the residence time.

36 Claims, 2 Drawing Sheets

TREATMENT OF PHOSPHORUS IN SEPTIC TANK EFFLUENT

This invention relates to the treatment of polluted water, and especially to the treatment of effluent water from septic-tank systems, being effluent water which has too high a phosphorus content.

BACKGROUND TO THE INVENTION

The quantity of phosphorus in effluent water from residences is often the factor which limits the concentration of residences that can be accommodated around the banks of a lake. Too much phosphorus in the lake water leads to a nutrient imbalance, a depletion of the oxygen content of the water, a damaging effect on the fish population, and other effects.

In order to permit more residences around the lake, or to enable the water of the lake to be kept clean, a system for removing the phosphorus from the effluent water is desirable. The invention is aimed at providing a more practical and cost-effective system for removing phosphorus from effluent water than has been available hitherto.

GENERAL FEATURES OF THE INVENTION

The invention makes use of the fact that inorganic phosphate dissolved in water can be adsorbed and precipitated out of solution as an insoluble phosphate, by passing the phosphate-laden water over and through grains of a treatment material, such as iron oxide.

The iron oxide, $Fe_2O_3$, containing a ferric ion, gives rise to an ion exchange reaction, whereby ferric phosphate, $Fe_2(PO_4)_3$ is formed, which precipitates.

Under conditions of oxygen depletion, the iron oxide is more likely to have a ferrous form, whereby the ion exchange leads to ferrous phosphate $Fe_3(PO_4)_2$, or the hydrated vivianite form, $Fe_3(PO_4)_2.8H_2O$. Additives such as limestone may be added to accelerate precipitation, or to buffer pH.

The phosphorus in the effluent emerging from a septic tank usually is mainly of the inorganic form; the organic form prevails in the water entering the septic tank, but the organic component is split away by bacterial action in the septic tank.

The ion exchange treatment reaction will not proceed in respect of the organic phosphate molecules, and so there would be little point in adding the iron oxide before the water enters the septic tank, nor until the water has had a good residence time within the tank. One possible location for the iron oxide would be to place the iron oxide at the very bottom of the septic tank, whereby the water does not interact with the iron oxide until the organic components have had time to have been-stripped away. However, there are obvious difficulties, not least in terms of accessibility for replenishment, associated with placing the iron oxide at the bottom of the septic tank.

It might be considered that the iron oxide could be mixed with an inert matrix material such as sand, and the water passed through that. However, it is difficult to get the permeability of a sand-oxide mixture just right, and to maintain that permeability over a long service period. Also, a sand bed cannot cope with a sudden overload of organic phosphate, as can occur occasionally even with well-managed systems. Besides, sand is heavy; and often there is no sand available of the right consistency at the site, and suitable sand has to be trucked in.

Preferably, in the invention, it is the effluent water from the septic tank that undergoes treatment. Preferably the water is treated before it passes to the tile-bed.

Incidentally, the phosphate could still be treated, from the chemical treatment standpoint, after the aerobic nitrification reaction which takes place in the tile bed, but, from the physical standpoint, it would be difficult to address treatment to the post-tile-bed water because that water is infiltrated into the ground below the tile-bed. Upon emerging from the septic tank, i.e before entering the tile-bed, the water is still contained in a pipe or conduit, and can easily be routed through a phosphate treatment station.

In the invention, the grains of the treatment material are contained within the cells or pores of a block of foam. The foam is resilient, i.e the foam quickly recovers its nominal shape after being squeezed and released. The foam is open-celled, i.e the cells or pores are connected, whereby when the foam is squeezed and released under water, water enters the cells throughout the whole inside of the block.

The material of the foam preferably is polyurethane, or related plastic material.

The grains of treatment material may be placed in the cells of the foam in a number of ways. Preferably, the squeezed foam block is placed in a wet slurry of the material, and released. The grains are carried into the cells by the water that then flows into and fills the cells—provided the cells and grains are of a compatible size. Details of this system are described below. It has been found that the squeeze-in-a-slurry system produces a surprising degree of uniformity in the spread of the material right through the whole foam block.

Alternatively, in some cases the treatment material can be electro-plated or electro-deposited into the cells.

Alternatively again, in some cases, the material may be in solution in the water that is drawn into the cells of the foam, and then the material is adsorbed onto the walls of the cells, and is thereby constrained against subsequent movement.

It is also possible in some cases to mix the grains of treatment material in with the polyurethane material from which the foam is made, prior to foaming. After foaming, often the grains tend to reside at the surface of the material, i.e protruding from the walls of the cell into the open centre of the cell.

The invention lies in providing a body of foam material, being foam material of the interconnected-cell, or open-cell, type, and in providing a quantity of grains of treatment material, for example grains of iron oxide. The grains of treatment material are placed in close adjacency to the foam.

The contaminated water is conducted into and through the foam material, whereby the water—that is to say, the contaminants in the water—are held, by the foam, in close adjacency to the grains of treatment material.

For the treatment to be effective, the contaminant should be of the type that is remediated by prolonged contact with the treatment material. For example, where the water is sewage water, and the contaminant is phosphorus, the contaminant may be adsorbed, and precipitated, as a result of prolonged contact with grains of, for example, iron oxide.

One of the benefits of passing the water through the open-cell foam is that foam tends to keeps the water static, or almost static, thereby preventing the water draining away, as it might otherwise tend to do, especially during periods between dosings. Thus, water might tend to drain out of a body of the grains of treatment material, in the absence of the foam. The foam increases the residence time, and promotes equality of residence time of the contaminated water. Also, when water passes through a body of, for example, iron oxide, after a period of time the water tends to create channels, whereby much of the water passes quickly through the channels, while some of the water is snagged and moves very slowly. The foam tends to prevent the water developing and flowing in such preferred channels.

Because the foam retains the water, the invention is most efficacious when the dosings are intermittent. If the flow rate of water were continuous, water retention, and the prevention of draining away between dosings, would not be so important.

On the other hand, in general, it may be regarded that the foam serves to retain water to an extent that may be compared with a fine-grained silt, and yet foam has a porosity that permits water to travel there through, over a long service period, without clogging up, in a manner that may be compared with gravel or sand.

In a domestic septic tank system, for example, dosing occupies less than 1 hour per day, whereby the water remains more or less static in the foam, and held near to the treatment material, for at least 23 hours per day. Then, the water is gradually progressed through the foam and treatment materials as further dosings are added.

The invention may be realised in two formats. In the first format, the treatment material, for example iron oxide, is dispersed through the foam, i.e the grains of iron oxide occupy the cells or pores of the foam, including those cells deep inside the block of foam, as will be described. In the second format, the iron oxide etc is provided in bags of the iron oxide, the bags preferably being configured into a stack of bags intercalated with blocks of foam.

The first format may be described in more detail as follows.

The grains of treatment material may be placed in the cells in the foam by the operation of squeezing and releasing the foam, repeatedly, under water in a container containing the grains of treatment material. If the grains are of the right size, in relation to the cell size, and if the squeezing and releasing is done with some vigour, the blocks of foam can be expected to be filled, more or less evenly throughout the blocks, with dispersed grains of iron oxide. When the water passes through the foam, the water cannot fail to be in close proximity to the treatment material throughout its (prolonged) passage. As the contaminants are adsorbed and precipitated by the action of the treatment material, the precipitates are retained in the foam. The longer the residence time of phosphorus in close proximity to iron oxide, the more precipitation has a chance to take place.

Preferably, the body of foam material is configured as a horizontal layer, and the contaminated water is passed through the layer in a vertical direction. The water may be passed either upwards or downwards. If the water passes upwards, the foam blocks generally remain saturated, i.e under water, all the time. In this case, the foam serves to even out, and slow down, the movement of the water. The problem of channelling is minimised, since foam generally is very resistant to the establishment of channels of flow. For upwards flow, it is generally necessary to place the foam and the treatment material in a container. The foam should be a tight fit in the container, to make sure there is no pathway for the water to by-pass the foam.

If the water passes downwards, gradual channelling of the treatment material would be a serious problem, if there were no foam. Generally, there is no need for a container if the water passes downwards. The foam blocks retain the water, and hold the water within the blocks, even though the foam is not contained, and any excess water in the foam can drain freely away.

Preferably, the foam is in separate layers of foam, which may be removed individually, for replenishment. Each layer may be a one-piece block, or may be a collection of smaller pieces of foam, preferably bagged.

In the first format, the grains are dispersed within the foam itself, and they are placed there by vigorously squeezing the foam in the presence of the grains, so the grains are drawn into the pores. The foam must therefore be of the type which can accomplish this activity. The foam must be soft, so it can be squeezed, and elastically resilient, so it will return to shape after being squeezed.

For original manufacture, the operation of dispersing the grains through the foam can be carried out in-factory, whereby the blocks of foam are shipped from the factory with the grains already in the cells. For replenishment, the user may squeeze the foam blocks himself.

When replenishing, preferably the old grains should be washed out of the foam first. The action of cleansing the foam, prior to replenishment, is accomplished by squeezing the foam out in clean water.

It may be noted that the foam can serve to retain the contaminants within itself. The foam can serve as a transport medium for conveying the contaminant away, if that should be necessary.

As mentioned, in the second format, the grains of treatment material are provided in a configuration that is physically separate from the body of foam material. Preferably, the iron oxide etc is contained in a bag (made of permeable material); that is to say, in several bags, which are arranged as a stack of intercalated bags of iron oxide and blocks of foam.

Preferably, the stack is dosed from above, whereby no container is needed: the foam blocks serve to prevent the water draining away between dosings. Preferably, the horizontal extent of the layers of foam is smaller than the horizontal extent of the treatment material, whereby water passing down from the foam cannot by-pass the treatment material, but must pass through the bag of treatment material.

Preferably, the bags of treatment material are replaceable, as bags, for replenishment and replacement by bags of fresh treatment material.

Typically, in the stack, each foam layer is no more than 15 cm thick, and each bag is no more than 3 cm thick.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
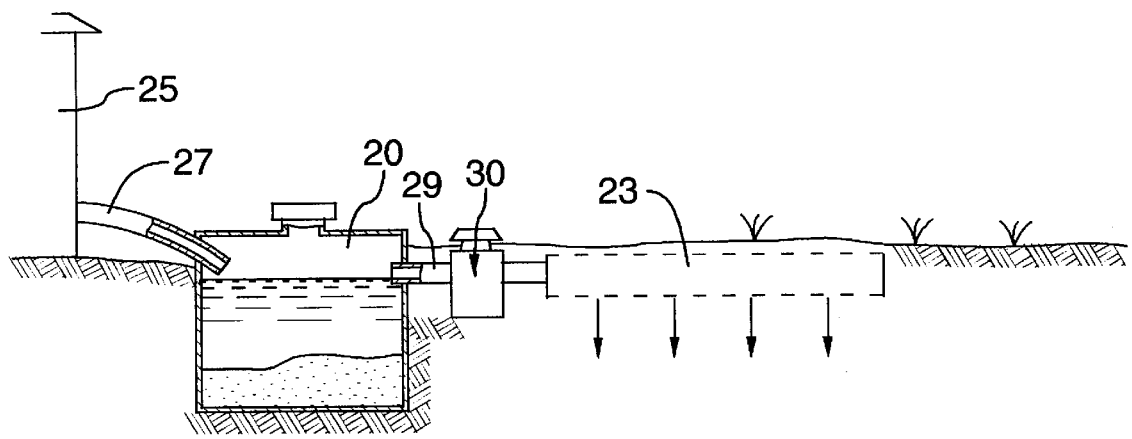
FIG. 1 is a diagram of a septic tank treatment system, having a treatment station which embodies the invention.

FIG. 1 is a diagram of a septic tank sewage treatment system, of the kind used for residences in a region where there is no mains drainage and sewage treatment system laid on. Such systems are used, for example, for vacation cottages situated on the shores of lakes, and for rural residences of all kinds.

The conventional septic tank system comprises the septic tank itself 20, and an aerobic tile-bed or soakaway 23. The septic tank receives effluent water from the residence 25 via a pipe 27, and water is transferred from the septic tank 20 to the tile-bed 23 via a conduit 29. From the tile bed 23, the effluent water soaks into the ground.

In accordance with the invention, a further treatment station 30 is interposed between the septic tank 20 and the tile bed 23, i.e in the conduit 29. In the treatment station 30, the water is passed through sponge or foam containing iron oxide, in which the by-now-inorganic phosphate undergoes the ion-exchange reaction, and precipitates as insoluble iron phosphate.

Figure 2:
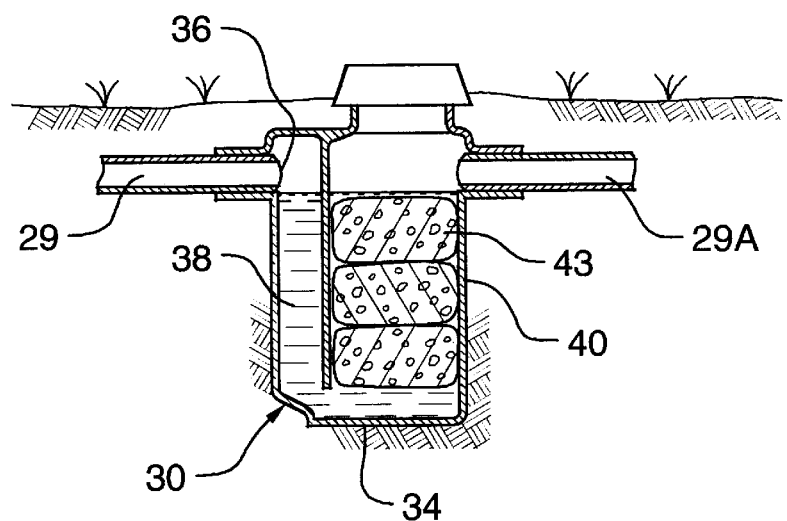
FIG. 2 is cross-sectional side view of a component of the treatment station.

The structure of the treatment station 30 is shown in FIG. 2. A receptacle 34 is formed as a moulding in plastic. The receptacle includes an inlet port 36 leading to a passageway 38 for conveying the incoming water from the septic tank to the bottom of the receptacle. The water then passes upwards through a compartment or chamber 40, and emerges through an outlet port 43, and passes thence, via conduit 29A, to the tile-bed 23.

The compartment 40 contains a number of blocks 43 of foam or sponge. The blocks are so sized and shaped as to fill the horizontal cross-sectional profile of the chamber 40. The foam is resilient, and the blocks are slightly oversized, whereby the blocks of foam are compressed (slightly) against the walls of the chamber 40. By over-filling the profile, it is ensured that water in passing upwards through the chamber 40 cannot by-pass the foam.

The foam may be provided in one deep block or, as shown, in a series of conveniently shallow blocks 43 placed one on top of another, which in aggregate make up the vertical depth of the chamber 40. It is preferred that the horizontal profile be filled by just one block, but it can be arranged that plural blocks are required to fill the profile: in that case, care must be taken, with the design of the blocks, that leak-channels are not allowed to become established between the blocks, or between the blocks and the walls of the chamber, whereby water could flow upwards through the chamber without passing through the foam.

Figure 3:
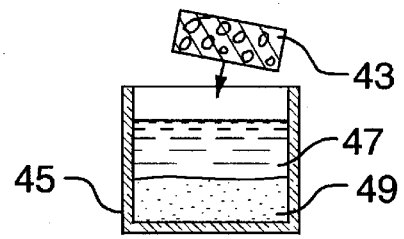
FIG. 3 is a diagram showing a stage in preparing the treatment station for use.

In order to treat the (inorganic) phosphate dissolved in the water, particles of iron oxide are placed in the pores of the sponge or foam. As shown in FIG. 3, one of the blocks 43 is placed in a container 45, which contains a slurry of water 47 and a quantity 49 of iron oxide powder.

To charge the block with iron oxide, the foam block is placed into the water, and squeezed. (This may be done by hand, or mechanically, as desired.) Upon release, the water soaks into the pores of the foam, and the grains of iron oxide in the water are also carried into the pores. The squeezing and releasing is done several times, whilst agitating the water and stirring up the iron oxide powder.

It has been found that the iron oxide powder can easily be distributed substantially evenly throughout all the pores of the whole block of foam, in just a few squeezings: thus, it is not difficult for a person, with only a little skill and care, to charge the block of foam with an evenly-distributed quantity of iron oxide powder. Naturally, the foam must be of a sufficiently resilient consistency to be amenable to the operation of squeezing and releasing.

Figure 4:
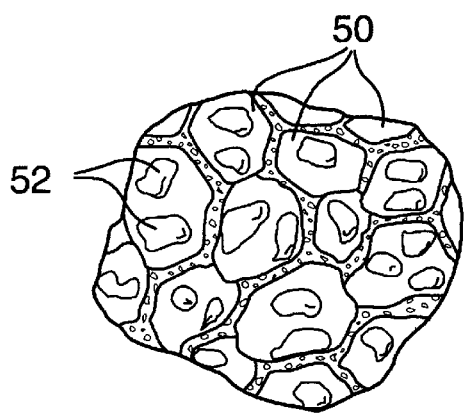
FIG. 4 is a magnified view of a portion of a block of foam.

FIG. 4 shows the condition of the pores 50 of the foam after the block has received a charge of iron oxide powder. The foam is of the connected-cell type, whereby water, and the grains of iron oxide, can pass freely into and through the cells or pores.

The size of the grains of iron oxide powder is important, in relation to the size of the pores in the foam. FIG. 4 shows grains 52 of about the maximum size, in relation to pore size, whereby the grains will pass freely into and through the foam. Here the grains lodge in the pores more or less by mechanical constraint.

Figure 4A:
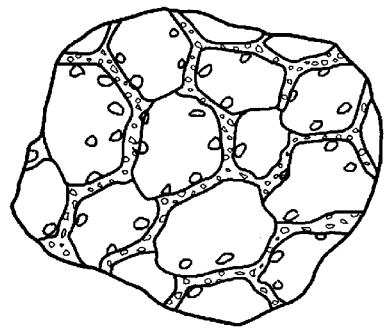
FIG. 4A is a view corresponding to FIG. 4 of another block of foam.

In FIG. 4A, the grains 54 are much smaller in relation to the pore size. Now, the grains are retained in the cells or pores more by adhesion to the material of the foam, i.e to the walls of the cells, than by mechanical constraint: that is to say, the grains become embedded in the walls of the cells. The shape of the grains can be important in how well the grains are retained in the cells: grains with angular corners will be more readily retained than rounded grains. Either way, however, the key is that the grains be small enough to enter and pass freely through the cells, and that the grains be retained in the cells, by some means.

When the pore size of the foam is 0.5 mm average, the grain size of the iron oxide particles should be between 0.05 mm and 0.3 mm.

It is important that the grains of iron oxide do not become dislodged due to the flow of water through the blocks, during operation. The retention of the grains within the cells is a key aspect of the treatment performance of the system; the fact that the water passes through the very cells in which the grains are retained, over and over from cell to cell, while the grains stay put, is what makes the system so efficacious.

Once the blocks have been loaded with iron oxide particles, the blocks are placed in the chamber 40, as shown in FIG. 2. Water passes through the conduits 29,29A, and percolates up through the blocks.

The inorganic phosphate in the water undergoes the ion exchange reaction, forming (insoluble) iron phosphate, as described above. The iron phosphate precipitates onto the grains, i.e into the cells of the foam.

Eventually, the cells become clogged with the precipitates (not just with phosphorus but with calcium carbonate and other salts), and the permeability of the block starts to become less, whereby the flow of water through the chamber 40 becomes restricted. Also eventually, the particles of iron oxide become enveloped in a coating of precipitated iron phosphate, whereby the particles become insulated from the ion exchange reaction. Generally, the potential of the reactive medium to adsorb P becomes diminished.

After a period of use, therefore, the used blocks of foam should be taken out, and replaced with clean blocks, containing a fresh charge of iron oxide powder.

The used blocks, containing precipitated iron phosphate, unused iron oxide, and, inevitably, particles of other solid material that has been carried through from the septic tank, may be cleaned (e.g by back-flushing). However, usually the used blocks will simply be discarded (in an environmentally-appropriate manner). Foam is an inexpensive material; and the foam can easily be transported, even by aircraft in very remote areas, especially if the foam is pre-compressed. The quantity of foam needed for an effective system can easily be brought in.

It may be noted that the used foam blocks can easily be stored, and will continue to retain the pollutant materials therein, pending transport away for disposal.

The designer may arrange that the water from the septic tank flows or trickles downwards through the foam blocks, rather than upwards. The foam does not have to be kept saturated in order for the ion exchange reaction to take place. However, flowing the water upwards leads to longer and more consistent residence times, and more efficient operation.

The size of the receptacle of course can be varied as to desired capacity, but a typical aggregate volume of the foam blocks would be 1 cu meter. The blocks in a system of that size, in a typical rural residence installation, would be subject to replenishment every several years, which is in keeping with the needs of the rest of the septic tank system.

Other substances, i.e other than iron oxide, can be utilised to provoke the ion exchange reaction that leads to an insoluble, precipitatable, phosphate. For example, under the conditions of pH, temperature, etc generally encountered in septic tank systems, iron hydroxides, or iron metal, will lead to insoluble (precipitatable) phosphates. Such substances are not so readily available as iron oxide in granular form, but may be preferred in some circumstances. Sometimes, iron itself can become dissolved in water in unacceptable quantities, which might indicate the use of another substance. Some other metals, such as aluminum, are liable to yield toxic concentrations in water, and are contra-indicated for that reason.

Figure 5:
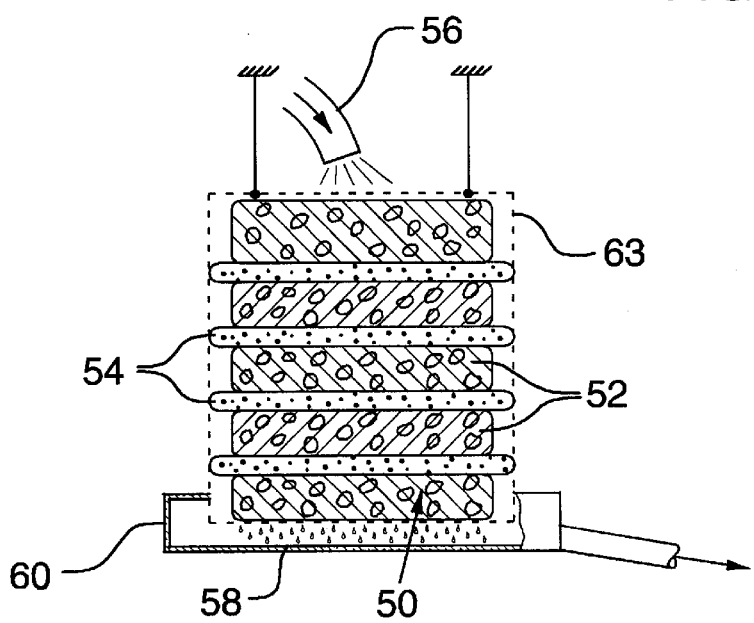
FIG. 5 is a cross-sectional side view of a component of another treatment station.

In FIG. 5, the treatment station comprises a stack 50 of blocks 52 of open-cell foam, intercalated with bags 54 containing iron oxide powder. The bags 54 are made of geofabric, which allows water to pass therethrough. The contaminated water is fed in, on top of the stack, at 56, and passes down through the stack, draining freely out from the bottom thereof, at 58. The water is collected in a tray 60, and conveyed away.

Dosing is intermittent. Between dosings, the open-cell foam acts to keep the water static, or almost static. After steady state conditions have been reached, the foam remains almost completely saturated between dosings, by sponge action. In fact, if the pore size of the foam is chosen accordingly, the water can be expected to remain static in the foam for a period of weeks, if no dosings should occur. It should be emphasised that the water remains static in the foam by sponge action: no container is required to contain the water, and prevent the water draining away. Insofar as some means is required to hold the stack together mechanically, a mesh basket 63 may be provided, which may be suspended from above, as shown.

Under equilibrium conditions, when a charge of water is dosed on top of the stack, that same volume of water drains out of the bottom of the stack. But the actual molecules of water that drain out the bottom are molecules of water that, by the time they drain out, have been present in the stack for a considerable period, having been gradually travelling down the stack as more dosings were added.

The foam keeps the water static, or nearly static, between dosings, whereby the treatment reactions and processes have ample time to take place, and to be completed. Without the foam to retain the water between dosings, the water, or some of the water, might pass through the stack too quickly for treatment to be completed.

I claim:

1. Water treatment procedure, for treating water contaminated with a contaminant of the kind that can be treated by passing the contaminant-laden water through a treatment material, wherein:

the procedure includes the step of providing a body of foam material, and the foam material is of the open-cell type;

the body of foam material is soft and squeezable, and returns resiliently to shape after being squeezed;

the procedure includes the step of providing a container, in which is contained a quantity of grains of the treatment material, and a quantity of water;

the procedure includes the step of compressing the body of foam material, under water in the container, and of then releasing the foam material from compression, whereby the water, and the grains of treatment material, enter and flow into the pores of the foam material;

the procedure includes the step of vigorously and repeatedly compressing and releasing the foam material, under the water, whereby the grains of treatment material in the water are progressively drawn into the pores of the foam material, and become dispersed and distributed therethrough;

the procedure includes the step of then removing the body of foam material, with the grains of treatment material contained in the pores thereof, from the container;

the procedure includes the step of then conducting the contaminated water into and through the body of foam material;

whereby the contaminants in the water are brought into prolonged proximity with the grains of treatment material.

2. Procedure of claim 1, wherein:

the procedure includes the step of dosing the body of foam material with charges of the contaminated water, periodically;

and the water remains substantially static in the body of foam material, between dosings.

3. Procedure of claim 2, wherein dosing occupies a time period, or periods in total, of less than 1 hour per day.

4. Procedure of claim 1, wherein the treatment material comprises an adsorbent of the contaminant.

5. Procedure of claim 1, wherein the treatment material is a metal oxide, and the contaminant in the water is of the kind that undergoes an ion-exchange reaction when brought into prolonged proximity with a metal oxide.

6. Procedure of claim 1, wherein the treatment material is, or includes, iron oxide.

7. Procedure of claim 1, wherein the procedure includes the step of passing the water vertically upwards through the body of foam material.

8. Procedure of claim 1, wherein:

the procedure includes the step of providing a container, having walls, and the walls define a hollow interior chamber;

the body of foam material is so dimensioned as to be a tight fit in the container, and to seal against the walls of the container, whereby water cannot pass through the container by any route other than by passing through the body of foam material.

9. Procedure of claim 1, wherein the procedure includes the step of passing the water vertically downwards through the body of foam material.

10. Procedure of claim 1, wherein the procedure includes the step of enabling the water to drain freely and naturally from the bottom of the body of treatment material.

11. Procedure of claim 1, wherein the body of foam material comprises two or more layers of the foam material, arranged one above the other in the container.

12. Procedure of claim 11, wherein the layer or layers of foam material are removable from the container.

13. Procedure of claim 12, wherein each layer comprises a respective unitary block of foam material.

14. Procedure of claim 12, wherein each layer comprises a respective bagged collection of pieces of soft foam material.

15. Procedure of claim 1, wherein the contaminant in the water is phosphorus.

16. Water treatment procedure, for treating water contaminated with a contaminant of the kind that can be treated by passing the contaminant-laden water through a treatment material, wherein:
  the procedure includes the step of providing a body of foam material, and the foam material is of the open-cell type;
  the procedure includes the step of providing the treatment material in the form of a permeable body of grains of the treatment material;
  the procedure includes the step of providing the permeable body of grains of treatment material in a configuration that is physically separate from the body of foam material;
  the procedure includes the step of containing the grains of treatment material in a bag of a permeable material;
  the procedure includes the step of configuring the bag of treatment material and a plurality of layers of the foam material as a vertical stack of intercalated horizontal layers;
  the procedure includes the step of applying the contaminated water on top of the stack, and of providing means for the water to percolate down through the stack;
  whereby the water is partially retained in the layers of foam material, and the contaminants in the water are thereby brought into prolonged proximity with the treatment material.

17. Procedure of claim 16, wherein the stack includes a plurality of bags of the treatment material and a corresponding plurality of layers of the foam material, configured as a vertical stack of intercalated horizontal layers.

18. Procedure of claim 16, wherein the procedure includes the step of dosing the stack with charges of the contaminated water, periodically, and the water remains substantially static in the stack, between dosings.

19. Procedure of claim 18, wherein dosing occupies a time period, or periods in total, of less than 1 hour per day.

20. Procedure of claim 16, wherein the treatment material comprises an adsorbent of the contaminant.

21. Procedure of claim 16, wherein the treatment material is a metal oxide, and the contaminant in the water is of the kind that undergoes an ion-exchange reaction when brought into prolonged proximity with a metal oxide.

22. Procedure of claim 16, wherein the treatment material is, or includes, iron oxide.

23. Procedure of claim 16, wherein each layer of foam material comprises a respective unitary block of foam material.

24. Procedure of claim 16, wherein each layer of foam material comprises a respective bagged collection of pieces of soft foam material.

25. Procedure of claim 12, wherein the body of foam material is soft and squeezable, and returns resiliently to shape after being squeezed.

26. Procedure of claim 16, wherein the horizontal extent of the layers of foam is smaller than the horizontal extent of the treatment material, whereby water passing down from the foam cannot by-pass the treatment material, but must pass through the bag of treatment material.

27. Procedure of claim 17 wherein the bags of treatment material are replaceable, as bags, and the procedure includes the step of periodically assessing whether the treatment material needs replenishment, and if so of replacing the bags in the stack with bags of fresh treatment material.

28. Procedure of claim 17, wherein, in the stack, each foam layer is no more than 15 cm thick, and each bag is no more than 3 cm thick.

29. Procedure of claim 16, wherein the contaminant in the water is phosphorus.

30. Water treatment apparatus, for treating water contaminated with a contaminant of the kind that can be treated by passing the contaminant-laden water through a treatment material, wherein:
  the apparatus includes a body of foam material, and the foam material is of the open-cell type;
  the treatment material is in the form of a permeable body of grains of the treatment material;
  the permeable body of grains of treatment material is physically separate from the body of foam material;
  the grains of treatment material are contained in a bag of a permeable material;
  the appararus includes the bag of treatment material and a plurality of layers of the foam material, arranged as a vertical stack of intercalated horizontal layers;
  the apparatus includes means for applying the contaminated water on top of the stack, and means for enabling the water to percolate down through the stack;
  whereby the water is partially retained in the layers of foam material, and the contaminants in the water are thereby brought into prolonged proximity with the treatment material.

31. As in claim 30, wherein the stack includes a plurality of the treatment material and a corressponding plurality of layers of the foam material, configured as a vertical stack of intercalated horizontal layers.

32. Water treatment procedure, for treating water contaminated with a containment of the kind that can be treated by passing the contaminant-laden water through a permable body of grains of a treatment material, wherein:
  the procedure includes the step of providing a body of foam material, and the foam material is of the open-cell type;
  the procedure includes the step of providing a quality of grains of treatment material, and of placing the grains in, or in close adjacency to, the foam;
  procedure includes the step of conducting the contaminated water into and through the foam material;
  whereby the contaminants in the water are brought into prolonged proximity with the
  the procedure includes the step of repeating the compressing and releasing of the foam treatment material;
  the grains of treatment material are dispersed and distributed through the pores of the body of foam material;
  the procedure includes the step of periodically assessing whether the treatment material need replenishment, and if so of taking the foam material out of the container;
  the procedure includes the step of transporting the foam material to a replenishment station;

the procedure includes the step of providing, at the replenishment station, a replenishment vessel, in which is contained a quality of grains of replenishment material, and a quantity of water;

the procedure includes the step of compressing the foam material, under water in the container, and of then releasing the foam material from compression, whereby the water, and the grains of replenishment material, enter and flow into the pores of the foam material;

the procedure includes the step of vigorously and repeatedly compressing and releasing the foam material, under water, whereby the grains of replenishment material in the water are progressively drawn into the pores of the foam material.

33. Procedure of claim 32, wherein the procedure includes the step of repeating the compressing and releasing of the foam until the grains are dispersed and distributed substantially evenly through the pores in the layer of foam material.

34. Water treatment procedure, for treating water contaminated with a contaminant of the kind that can be treated by passing the contaminant-laden water through a permable body of grains of treatment material, wherein:

the procedure includes the step of providing a body of foam material, and the foam material is of the open-cell type;

the procedure includes the step of providing a quantity of grains of treatment material, and of placing the grains in, or in close adjacency to, the foam;

the procedure includes the step of conducting the contaminated water into and through the foam material;

whereby the contaminants in the water are brought into prolonged proximity with the treatment material;

the grains of treatment material are dispersed and distributed through the pores of the body of foam material;

the procedure includes the step of providing a cleansing vessel, which contains a quantity of water;

the procedure includes the step of compressing the foam material, under water in the container, and of releasing the foam material, whereby the water enters and flows into the foam;

the procedure includes the step of vigorously and repeatedly compressing and releasing the foam material, under water, whereby any grains of material present in the pores of the foam material are progressively washed out of the pores, and out of the material.

35. Procedure of claim 34, wherein the procedure includes the step of repeating the compressing and releasing of the foam, under water, and of replacing the water with clean water, until substantially all grains have been washed out of the foam.

36. Water treatment procedure, for treating water contaminated with a contaminant of the kind that can be treated by passing the contaminant-laden water through a permable body of grains of treatment material, wherein:

the procedure includes the step of providing a body of foam material, and the foam material is of the open-cell type;

the procedure includes the step of providing a quantity of grains of treatment material, and of placing the grains in, or in close adjacency to, the foam;

the procedure includes the step of conducting the contaminated water into and through the foam material;

whereby the contaminants in the water are brought into prolonged proximity with the treatment material;

the procedure includes the step of providing a container, having walls, and the walls define a hollow interior chamber;

the body foam material is so dimensioned as be a tight fit in the container, and to seal against the walls of the container, whereby water cannot pass through the container by any route other than by passing through the body of foam material;

the procedure includes the step of setting the body of foam material as a horizontal layer of the foam material, or as a plurality of horizontal layers of the foam material arranged one above the other in the container;

the procedure includes the step of passing the water upwards through the container;

the layer of layers of foam material are removable from the container;

the body of foam material is soft and squeezable, and returns resiliently to shape after being squeezed;

the grains of treatment material are dispersed and distributed through the pores of the body of foam material;

the procedure includes the step of periodically assessing whether the treatment material need replenishment, and if so of taking the layer or layers of foam material out of the container;

the procedure includes the step of transporting the layer or layers of foam material to a replenishment station;

the procedure includes the step of providing a cleansing vessel, which contains a quantity of water;

the procedure includes the step of compressing the foam material, under water in the container, and of releasing the foam material, whereby the water enters and flows into the pores of the foam;

the procedure includes the step of vigorously and repeatedly compressing and releasing the foam material, under water, whereby any grains of material present in the pores of the foam material are progressively washed out of the pores, and out of the material;

the procedure includes the step of repeating the compressing and releasing of the foam material, under water, and of replacing the water with clean water, until substantially all grains have been washed out of the foam;

the procedure includes the step of providing, at the replenishment station, a replenishment vessel, in which is contained a quantity of grains of replenishment material, and a quantity of water;

the procedure includes the step of compressing the foam material, under water in the container, and of then releasing the foam material from compression, whereby the water, and the grains of replenishment material, enter and flow into the pores of the foam material;

the procedure includes the step of vigorously and repeatedly compressing and releasing the foam material, under water, whereby the grains of replenishment material in the water are progressively drawn into the pores of the foam material;

the procedure includes the step of repeating the compressing and releasing of the foam material until the grains are dispersed and distributed substantially evenly through the pores in the layer of foam material.

* * * * *